United States Patent [19]

Fujinami et al.

[11] 4,035,764
[45] July 12, 1977

[54] COMBINATION METER FOR AUTOMOBILE

[75] Inventors: Hiroshi Fujinami, Okazaki; Hiroaki Yamaguchi, Anjo, both of Japan

[73] Assignee: Nippon Soken, Inc., Nishio, Japan

[21] Appl. No.: 569,748

[22] Filed: Apr. 21, 1975

[30] Foreign Application Priority Data

May 16, 1974 Japan .................. 49-56291[U]

[51] Int. Cl.² .................................... G08B 19/00
[52] U.S. Cl. .............. 340/52 F; 340/414
[58] Field of Search ............ 340/52 F, 52 R, 52 E, 340/53, 62, 213 R, 223, 263, 412, 414, 415

[56] References Cited

U.S. PATENT DOCUMENTS

| 2,571,360 | 10/1951 | Hallerberg | 340/52 F |
| 3,665,383 | 5/1972 | Fales | 340/52 F |
| 3,906,437 | 9/1975 | Brandwein et al. | 340/27 R |

*Primary Examiner*—Alvin H. Waring
*Attorney, Agent, or Firm*—Cushman, Darby & Cushman

[57] ABSTRACT

A combination meter for an automobile comprising a first group of indicators and a second group of indicators adapted to come into operation later than the first group of indicators by a predetermined time, whereby when a key switch is closed by the driver of an automobile, those items which are essential in the safe driving of the automobile are sequentially indicated thus enabling the driver to check each of these essential items.

4 Claims, 5 Drawing Figures

COMBINATION METER FOR AUTOMOBILE

BACKGROUND OF THE INVENTION

1. Field of the Invention

The presnt invention relates to a combination meter for an automobile in which when a key switch is closed by the driver of an automobile, items to be indicated are displayed in the order of their importance for the safe driving of the automobile.

2. Description of the Prior Art

Automobile combination meters known in the art are of the type in which each of the speedometer, distance recorder, temperature gauge, fuel gauge, etc., has its own dial plate or scale plate on which its internal needle is moved.

A disadvantage of the combination meters of the above type is that the indications show no movements not only upon closing of a key switch by the driver but also before the closing of the key switch, and therefore it is impossible to cause the driver to concentrate his attention on the desired part of the combination meter.

SUMMARY OF THE INVENTION

With a view to overcoming the foregoing difficulty, it is an object of the present invention to provide a combination meter for an automobile in which in order to arouse the attention of the driver to the safe driving of an automobile the indication of items is accomplished in the order of their importance to enable the driver to check the items individually and which is thus very useful from the safe driving point of view.

The combination meter of the present invention comprises a first group of indicators which start giving their indications in response to the output signal of a key switch and a second group of indicators which start giving their indications later than the first group of indicators by a predetermined time. Thus, there is given a great advantage that the driver can pay his attention to each of the units arranged on the combination meter and therefore the meter can be of a great service from the safety checking point of view. Another great advantage of the present invention is that while it is difficult to electrically control the displays in a mechanical meter of the type as shown in FIG. 1, the provision of the electrically controlled displays makes it possible to easily effect the necessary controls by means of signal lines only.

BRIEF DESCRIPTION OF THE DRAWING

The present invention will now be described in greater detail with reference to a preferred embodiment illustrated in the accompanying drawings, in which:

FIGS. 2 through 4 show the conditions at various operating phases of an embodiment of a combination meter according to the present invention, in which FIG. 2 is a front view showing the combination meter at the expiration of 1 second after the closing of a key switch (third phase), FIG. 3 is a front view showing the combination meter at the instant of closing the key switch (first phase), and FIG. 4 is a front view showing the combination meter at the expiration of 0.5 seconds after the closing of the key switch.

DESCRIPTION OF THE PREFERRED EMBODIMENT

Figure 1:
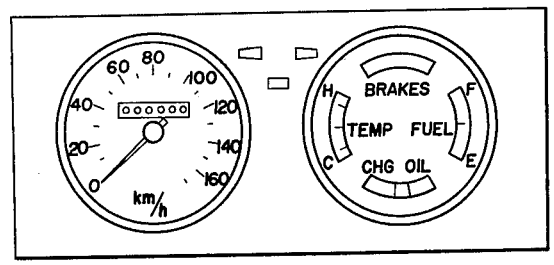
FIG. 1 is a front view of a conventional combination meter for an automobile.
Figure 2:
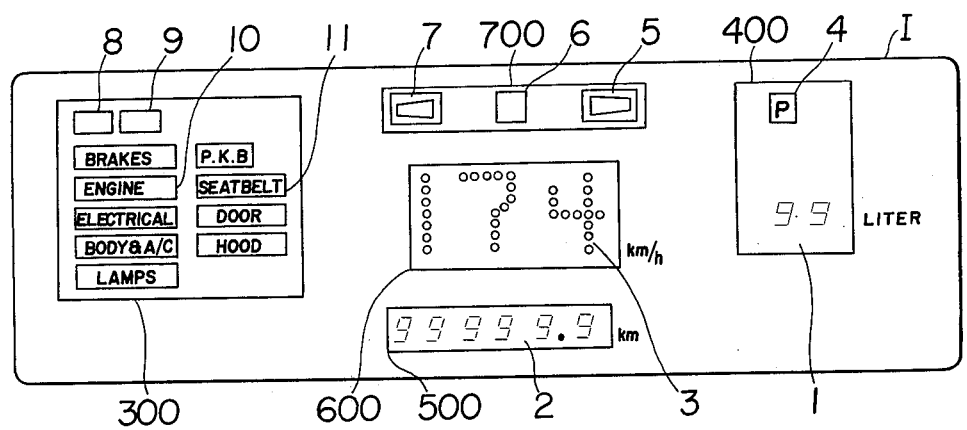

Referring first to FIG. 2, there is illustrated a combination meter of the present invention with all the lights thereof turned on. In FIG. 2, numeral 1 designates a digital gasoline gauge which gives a lighted indication of the level of remaining gasoline, 2 a distance recorder which gives a lighted indication of the distance travelled by the automobile, 3 a digital speedometer which gives a lighted indication of the speed of the automobile, 4 a shift position indicator consisting of light emitting diodes for indicating the position of the shift lever and the parking range is indicated in FIG. 2. Numerals 5 and 7 designate turn indicators each including an internally mounted incandescent lamp for producing light through its colored acrylic surface, 6 a high beam indicator for indicating the high beam in the similar manner as the turn indicators 5 and 7. Numeral 300 designates a warning system for the driver which indicates the existence of mulfunctions or irregularities in the various units of the vehicle. Similarly as the indicators 5 and 7, each of the indicators in the warning system includes an internally mounted incandescent lamp which produces light through its acrylic surface colored or printed with letters. Numeral 8 designates a red hazard indicator unit which lights a red lamp when the warning given is of a very serious nature, 9 a yellow hazard indicator unit which lights a yellow lamp when the warning given is not of a very serious nature.

Numeral 10 designates an inherent faulty condition indicator block for indicating the malfunctions or irregularities which result from the faulty conditions in the vehicle itself, as for example, a brake oil fault indicator (BRAKES) which is lit when the brake oil level drops below a predetermined value, an engine fault indicator (ENGINE) which is lit when the overheating of the engine occurs, a power supply fault indicator (ELECTRICAL) which is lit when the battery fluid level drops below a predetermined value, an air conditioner/washer fault indicator (BODY & A/C) which is lit when the refrigerant gas of the air conditioner runs low or the washer fluid level drops below a predetermined value, and a lamp fault indicator (LAMPS) which is lit when one or more of the headlamps is burnt out. Numeral 11 designates a driver's careless fault indicator block including for example a parking brake indicator (P.K.B) which is lit when the driver starts the vehicle without disengaging the parking brake, a seat belt indicator (SEATBELT) which is lit when the driver starts the vehicle without fastening the seat belts on him, a half-open door indicator (DOOR) which is lit when the driver starts the vehicle with the door left half-open, and a hood indicator (HOOD) which is lit when the driver starts the vehicle with the engine hood left half open.

All of the above described indicator devices are arranged on an instrument panel I provided in the front part of the driver's compartment.

Figure 3:
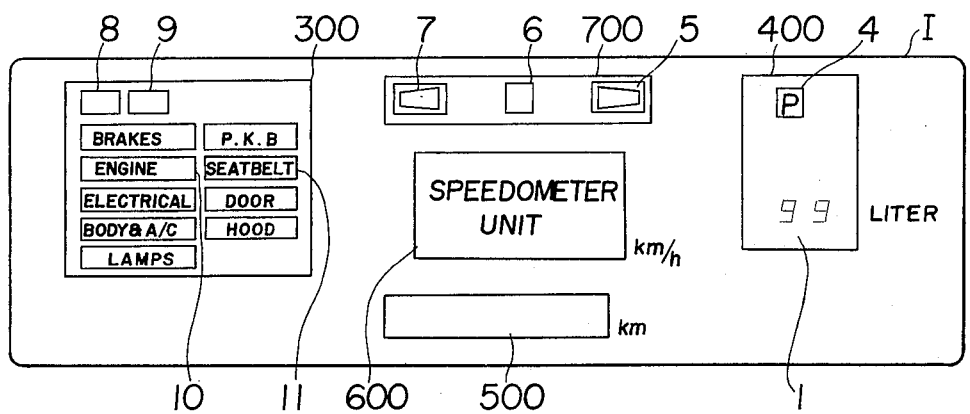
Figure 4:
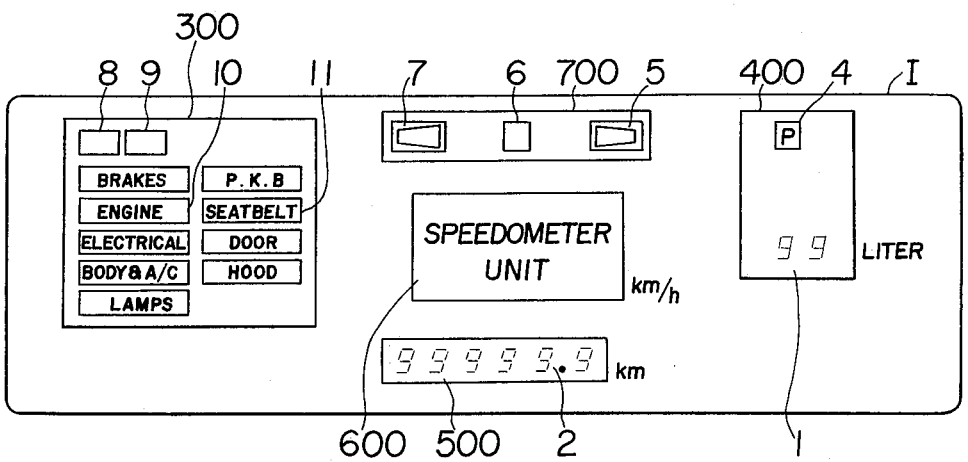

With the combination meter according to the preferred embodiemtn arranged as described above, at the instant that the key switch is closed, as shown in FIG. 3, digital indications appear on the gasoline gauge 1 and the light emitting diode type shift position indicator 4, while the driver warning system 300, the turn indicators 5 and 7 and the high beam indicator 6 give their indications simultaneously only when there are malfunctins or irregularities in any parts of the vehicle or when the turn switch or the like as on. In other words, the minimum indications essential in accomplishing the safe driving of the vehicle are provided during the first phase following the closing of the key switch. In the second phase, as shown in FIG. 4, the distance recoder 2 gives its indication in addition to those given in the first phase. In the third phase, the indication of the digital speedometer 3 is added to those given in the second phase, thus giving the indications as produced on the combination meter shown in FIG. 2.

Figure 5:
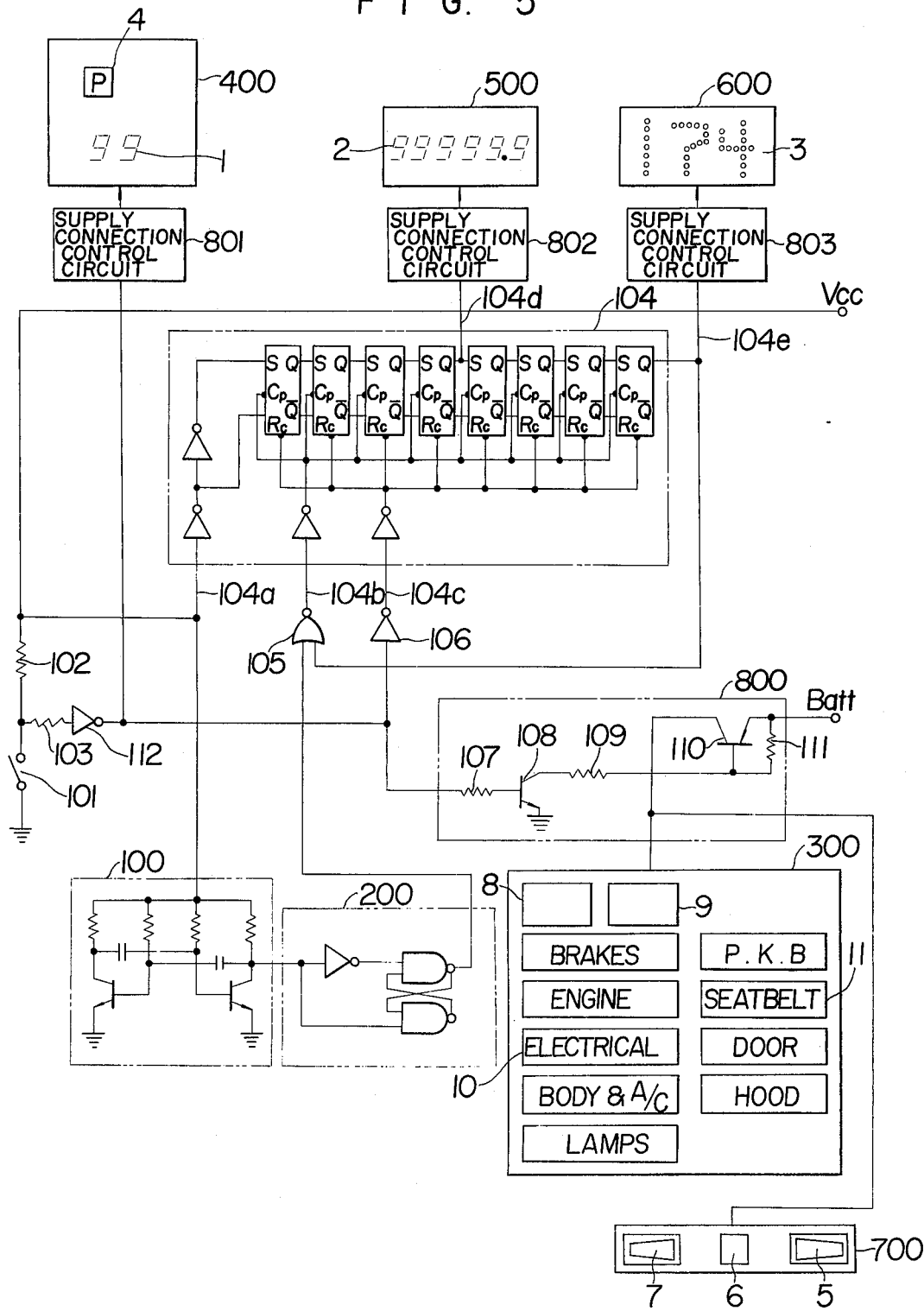
FIG. 5 is a wiring diagram of the embodiment of the combination meter according to the present invention.

The above-described operation is accomplished electrically with the circuitry of the wiring diagram shown in FIG. 5. In the circuit construction of FIG. 5, numeral 100 designates a reference oscillator for determining the required time difference between the first, second and third phases, which in the illustrated embodiment is composed of a known type of astable multivibrator having an oscillation frequency of 8 Hz. Numeral 200 designates a reshaping circuit for reshaping the output waveform of the reference oscillator 100 and its circuit construction comprises a combination of a known type of R-S flip-flop and an inverter for inverting and amplifying one input of the R-S flip-flop. Numeral 300 designates the driver warning system which is supplied from a transistor 110 as is a turn and high beam indicator unit 700 comprising the turn indicators 5 and 7 and the high beam indicator 6. Numeral 400 designates a shift and gasoline unit comprising the shift position indicator 4 and the digital gasoline gauge 1 and the model MD 111 of the Mont-Saint Company and the model 5082-7730 of the Yokokawa Hewlett Packard (hereinafter simply referred to as the Y.H.P) are used as the displays of these indicators. Numeral 500 designates a distance recorder unit including the distance recorder 2 and the Y.H.P 5082-7730 is used as its display, 600 a speedometer unit including the digital speedometer 3 and the model 5082-7500 of the Y.H.P is used as its display. Numeral 101 designates a switch operatively associated with the key switch so that when the key switch is closed, the switch 101 is also closed. A resistor 102 is a pull-up resistor for converting the output signal of the switch 101 into a logical signal. A resistor 103 is a protective resistor for protecting an inverter 112 from being damaged by the noise caused by the vehicle. Numerals 112, 106 and 105 designate known type of logical elements which are called as inverter and NOR gate. Numeral 104 designates an eight-bit shift register constituting a delay circuit which may for example be the Texas Instrument SN 74164. Numeral 104a designates the serial input terminal of the shift register 104 which is normally maintained at a 1 level, 104b the clock terminal of the shift register 104 which is connected to the output of the NOR gate 105, 104c the reset terminal of the shift register 104 which is connected to the output of the inverter 106, 104d the fourth bit output terminal of the shift register 104 which controls the power supply to the distance recorder unit 500, 104e the eight bit output terminal of the shift register 104 which controls the power supply to the speedometer unit 500. In FIG. 5, symbol Batt designates a terminal connected to the positive terminal of the vehicle battery, Vcc a terminal connected to a 5-volt stabilizing supply for using the logical element (TTL). A resistor 107 is a current limiting resistor for limiting the base current of a transistor 108 which is an NPN transistor for driving a transistor 110. A resistor 109 is a current limiting resistor for determining the base current of the transistor 110, and a resistor 111 is a resistor for releasing the leakage current between the base and emitter of the transistor 110. The transistor 110 is a PNP transistor for controlling the power supply to the warning system 300. The resistors 107, 109 and 111 and the transistors 108 and 110 constitute a supply connection control circuit 800. Numerals 801, 802 and 803 respectively designates a supply connection control circuit similar to the supply connection control circuit 800.

With the construction described above, the combination meter according to the invention operates as follows. When the key switch is closed, the switch 101 is closed and the input terminal of the inverter 112 goes to a 0 level. Consequently, the output of the inverter 112 goes to the 1 level and the transistor 108 is turned on through the resistor 107 of the supply connection control circuit 800. When this occurs, the transistor 110 is turned on so that the power is supplied to the driver warning system 300 and the turn and high beam indicator unit 700, and the driver warning system 300 and the turn and high beam indicator unit 700 start giving their lighted digital indications. The power is also supplied to the shift and gasoline unit 400 comprising the shift position indicator 4 and the digital gasoline gauge 1 through the supply connection control circuit 801 comprising the similar combination as the transistors 108 and 110, and the shift and gasoline unit 400 starts giving its lighted digital indication. On the other hand, the 1 level output of the inverter 112 is applied to the input terminal of the inverter 106 thus causing its output to go to the 0 level. Since the output terminal of the inverter 106 is connected to the reset terminal 104c of the shift resister 104, the output signal of the inverter 106 releases the resetting of the shift register 104 so that the output signals of the reference oscillator 100 are applied through the reshaping circuit 200 to the NOR gate 105 from which the signals are supplied to the clock terminal 104b of the shift register 104. In this case, the output signals of the reference oscillator 100 are applied to the clock terminal 104b of the shift register 104 owing to the fact that the eighth bit output terminal 104e of the shift register 104 is at the 0 level and the NOR gate 105 is open. Consequently, the 1 level data at the serial input terminal 104a of the shift register 104 is successively shifted to the right by the reference output signals applied from the reference oscillator 100 to the clock terminal 104b, so that when the four pulse signals are applied from the reference oscillator 100, a 1 level signal is generated at the fourth bit output terminal 104d of the shift register 104. In this way, this 1 level signal is generated at the expiration of 0.375 to 5 seconds after the closing of the key switch. This extent of 0.375 to 0.5 seconds represents the error resulting from the fact that the reference output signals from the reference oscillator 100 are asynchonous with the operation of the key switch. It is a matter of course that this interval may be easily determined with an improved accuracy by increasing the oscillation frequency of the reference oscillator 100 and by increasing the number of bits in the shift register 104. When the 1 level signal is generated at the fourth bit output terminal 104d of the shift register 104, the power is supplied to the distance recorder unit 500 including the distance recorder 2 through the supply connection control circuit 802 comprising the similar combination as the transistors 108 and 110, and the distance recorder unit 500 starts giving its lighted digital indication. When another four pulse signals from the reference oscillator 100 are applied to the clock terminal 104b of the shift resister 104, a 1 level signal is generated at the eighth bit output terminal 104e of the shift register 104 so that the NOR gate 105 is closed to block the passage of the reference output signals therethrough and the shift register 104 is caused to stop its operation thus maintaining the 1 level signal at each of the fourth bit and eighth bit output terminals 104d and 104e of the shift register 104. This 1 level signal at the eighth bit output terminal 104d also supplies the power to the speedometer unit 600 including the digital speedometer 3 through the supply connection control circuit 803 comprising the similar combination as the transistors 108 and 110, and the speedometer unit 600 starts giving its lighted digital indication. The beginning of the lighted digital indication takes place at the expiration of 0.875 to 1.0 second after the closing of the key switch. While, in the illustrated embodiment, the indications are made in the order of the first, second and third phases at intervals of about 0.5 seconds, any different time interval may be used in consideration of the human power of attention, the position of indications and the driver's visual angle, etc. When the vehicle comes to the end of its trip so that the key switch is opened, the switch 101 is opened and a 1 level signal is applied to the input terminal of the inverter 112 causing the reset terminal 104c of the shift register 104 to go to the 1 level. Consequently, both the output terminals 104d and 104e of the shift register 104 go to the 0 level and the power supply to the distance recorder unit 500 and the speedometer unit 600 is interrrupted thus extinguishing their indications. On the other hand, the output terminal of the inverter 112 goes to the 0 level and the supply of power to the driver warning system 300, the shift and gasoline unit 400 and the turn and high beam indicator unit 700 thus extinguishing their indications.

While, in the above-described embodiment of the invention, the first phase involves the indications of the shift and gasoline unit 400 including the shift position indicator 4 and the digital gasoline gauge 1, the turn and high beam indicator unit 700 and the driven warning system 300 which warns the driver of any malfunctions or irregularities in the various units of the vehicle since these items are considered most important in the safe driving of the vehicle, whereas the second phase involves the indication of the distance recorder unit 500 and the indication of the speedometer unit 600 is ranked as the final and third phase indication, it is needless to say that these indications may be classified as desired. Further, it is of course possible to classify the indications into two phases or four or more phases.

Further, while, in the above-described embodiment, the supply connection control circuit 801 is provided separately for the shift and gasoline unit 400, the shift and gasoline unit 400 may also be controlled by the supply connection control circuit 800 since the shift and gasoline unit 400 starts giving its lighted digital indication at the same time instant as the driver warning system 300 and the turn and high beam indicator unit 700.

Still further, while, in the above-described embodiment, the vehicle speed, the distance travelled and the level of the remaining gasoline are digitally indicated in the form of digits, a plurality of light emitting diodes or lamps may be sequentially caused to produce light to give analog indications, or alternately display plates which will be operated by energizing them may be employed to give the necessary indications in place of the lighted digital indications.

Furthermore, the means for accomplishing the delayed indicating operations need not be limited to the delay circuit comprising the shift register 104, and it may for example be any other electrical delay circuit or mechanical delay means employing a bimetal or the like.

What is claimed is:

1. A combination meter for an automobile comprising:
    a first group of indicators responsive to an output signal indicative of the closure of a key switch for simultaneously starting the indication operation of all said indicators;
    an oscillator for producing an oscillation signal;
    a counter connected to said oscillator for producing at least one command signal when the number of oscillations of said oscillation signal exceeds a predetermined number; and
    indicator means connected to said counter for starting the indication operation thereof in response to said command signal.

2. A combination meter according to claim 1, wherein said first indicators and indicator means are arranged on an instrument panel in the front part of an operating room of the automobile.

3. A combination meter for an automobile comprising:
    a storage battery installed in an automobile for supplying current;
    a warning system for electrically indicating the existence of faulty conditions in various units of said automobile, said warning system having a plurality of warning indicators for simultaneously indicating said respective units;
    an indication system for electrically indicating the running conditions varying with the automobile running;
    power supply connection control means connected between said storage battery and said warning system for automatically starting and controlling the supply of current from said storage battery to said warning system immediately upon the closing of a key switch of said automobile to cause automatically said simultaneous indication of said respective units by said plurality of warning indicators; and
    delay means connected between said storage battery and said indication system for automatically starting and controlling the supply of current from said storage battery to said indication system at the expiration of a predetermined time after the closing of said key switch for then causing said varying conditions to be indicated automatically.

4. A combination meter according to claim 3, wherein said delay means comprises:
    an oscillator for producing a predetermined frequency signal; and
    a counter connected to said oscillator for starting the supply of current to said indication system when said frequency signal counted therein exceeds a predetermined number.

* * * * *